(12) United States Patent
Palanisamy et al.

(10) Patent No.: US 8,514,102 B2
(45) Date of Patent: Aug. 20, 2013

(54) AIRCRAFT NAVIGATION ACCURACY DISPLAY SYSTEM

(75) Inventors: Dhivagar Palanisamy, Tamil Nadu (IN); Haricharan Reddy, Karnataka (IN); Vishnu Vardhan Reddy Annapureddy, Karnataka (IN); Saravanakumar Gurusamy, TamilNadu (IN); Santhosh Gautham, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1099 days.

(21) Appl. No.: 12/687,580

(22) Filed: Jan. 14, 2010

(65) Prior Publication Data

US 2011/0169665 A1  Jul. 14, 2011

(51) Int. Cl.
*G08B 21/00* (2006.01)
(52) U.S. Cl.
USPC ............................ 340/961; 340/945; 340/970
(58) Field of Classification Search
USPC ................ 340/961, 945, 970, 963, 971, 973, 340/979
See application file for complete search history.

(56) References Cited

U.S. PATENT DOCUMENTS

| | | | |
|---|---|---|---|
| 2,486,197 A | 10/1949 | Newbold | |
| 3,697,987 A | 10/1972 | Arthur | |
| 3,725,918 A | 4/1973 | Fleischer et al. | |
| 4,623,966 A | 11/1986 | O'Sullivan | |
| 4,839,658 A | 6/1989 | Kathol et al. | |
| 4,853,700 A | 8/1989 | Funatsu et al. | |
| 5,313,201 A | 5/1994 | Ryan | |
| 5,969,665 A | 10/1999 | Yufa | |
| 6,408,248 B1 | 6/2002 | Yancey, Jr. et al. | |
| 6,812,858 B2 | 11/2004 | Griffin, III | |
| 6,885,313 B2 * | 4/2005 | Selk et al. | 340/945 |
| 6,911,932 B1 * | 6/2005 | Martinez et al. | 342/25 C |
| 6,934,608 B2 | 8/2005 | Qureshi | |
| 6,944,541 B2 | 9/2005 | Pasturel et al. | |
| 7,219,013 B1 | 5/2007 | Young et al. | |
| 7,432,828 B2 | 10/2008 | He et al. | |
| 7,782,229 B1 * | 8/2010 | Barber | 340/979 |
| 7,961,115 B2 * | 6/2011 | Raje | 340/979 |
| 7,980,509 B2 * | 7/2011 | Bhargava | 244/50 |
| 8,109,464 B2 * | 2/2012 | Bhargava | 244/63 |
| 8,155,800 B2 * | 4/2012 | Raje et al. | 701/3 |
| 2004/0189492 A1 * | 9/2004 | Selk et al. | 340/973 |
| 2009/0173821 A1 * | 7/2009 | Bhargava | 244/50 |
| 2009/0315739 A1 * | 12/2009 | Raje | 340/979 |
| 2009/0319098 A1 * | 12/2009 | Raje et al. | 701/3 |
| 2011/0169665 A1 * | 7/2011 | Palanisamy et al. | 340/961 |
| 2012/0006935 A1 * | 1/2012 | Bhargava | 244/50 |

* cited by examiner

*Primary Examiner* — Hoi Lau
(74) *Attorney, Agent, or Firm* — Ingrassia Fisher & Lorenz, P.C.

(57) ABSTRACT

An aircraft display system is provided for rendering at least aircraft estimated position uncertainty (EPU) and/or vertical estimated position uncertainty (VEPU) values non-numerically and in a fairly intuitive manner. The system may also render the EPU and VEPU values non-numerically for other traffic entities within range of the aircraft.

15 Claims, 3 Drawing Sheets

AIRCRAFT NAVIGATION ACCURACY DISPLAY SYSTEM

TECHNICAL FIELD

The present invention generally relates to avionic displays, and more particularly relates to a system for displaying various navigational accuracies on one or more avionic displays.

BACKGROUND

Commercial aviation regulatory agencies have developed required navigation performance (RNP) protocols to facilitate the management of air traffic. Required navigation performance equipped aircraft can safely operate along various routes with less separation than previously needed. This can be significant because less separation means that the number of aircraft that can safely use a particular airspace may increase, and therefore accommodate the increasing demand for air traffic capacity. Under these protocols, RNP values may be assigned to various segments, or legs, of an aircraft's flight plan. For example, during approach an aircraft is typically assigned an RNP value of 0.3 nautical miles (nm). Moreover, for enroute portions of a flight aircraft are typically assigned an RNP value of 2.0 nm, for terminal portions the assigned RNP value is typically 1.0 nm, and when flying over the ocean the RNP value is typically 4.0 or 10.0 nm.

The RNP value defines an airspace within which the aircraft should remain for a predetermined percentage (e.g., 95 percent) of the total flying time. This airspace may be referred to as the RNP Obstacle Evaluation Area or, more simply, the RNP corridor. If the aircraft is RNP capable and if the pilot is appropriately certified, the pilot may attempt to travel the assigned landing leg while remaining within the RNP corridor. If, during the landing attempt, the aircraft breaches an RNP boundary and the leaves the corridor, a warning indicator (e.g., a hazard light) is produced inside the aircraft's cabin and the landing may be aborted and attempted again at a later time.

Closely related to RNP, are what are known as the vertical path performance limits (VPPL), the estimated position uncertainty (EPU), and the vertical estimated position uncertainty (VEPU). The VPPL is defined as a 99.7% limit for system vertical error. The EPU and VEPU are basically the value of the horizontal accuracy and the vertical accuracy, respectively, of the aircraft navigation system. The EPU may be defined as the probability that actual aircraft horizontal position differs from sensed aircraft horizontal position is less than a predetermined value (e.g., 0.05). The VEPU may be defined as a vertical position limit, such that the probability that the aircraft altitude differs from sensed aircraft altitude is less than a predetermined value (e.g., 0.05). It is noted that when the EPU and VEPU are reported by a global positioning system (GPS) or a global navigation satellite system (GNSS), the EPU is sometimes referred to as the Horizontal Figure of Merit (HFOM) and the VEPU is sometimes referred to as the Vertical Figure of Merit (VFOM).

Many conventional aircraft display systems include various means for displaying current RNP, as well as EPU and VEPU values to a flight crew. These display systems include implementations for displaying the current RNP, EPU, and VEPU values both numerically and non-numerically. However, the RNP, EPU, and VEPU values may not be displayed to the flight crew in a highly intuitive manner. Moreover, the EPU and VEPU values for other traffic entities within range of the aircraft may not be displayed at all.

Hence, it would be desirable to provide a one or more displays for rendering aircraft RNP, EPU, and VEPU values non-numerically and in a fairly intuitive manner and/or the EPU and VEPU values for other traffic entities within range of the aircraft. The present invention addresses at least this need.

BRIEF SUMMARY

In one exemplary embodiment, a display system for an aircraft includes a display device and a processor. The processor is in operable communication with the display device and is configured to receive at least data representative of estimated position uncertainty (EPU) for the aircraft, and traffic data associated with a traffic entity. The traffic data includes at least data representative of EPU for the traffic entity. The processor is further configured, in response to at least these data, to at least selectively render an image on the display device that includes an aircraft symbol representative of the aircraft, an EPU graphic representative of the EPU for the aircraft, a traffic entity symbol representative of the traffic entity, and a traffic entity EPU graphic representative of the EPU for the traffic entity. The EPU graphic encircles the aircraft symbol and has a radius proportional to the EPU for the aircraft. The traffic entity symbol is rendered at a position that is representative of traffic entity position relative to the aircraft. The traffic entity EPU graphic encircles the traffic entity symbol and having a radius proportional to the EPU for the traffic entity.

In yet another exemplary embodiment, a display system for an aircraft includes a display device and a processor. The processor is in operable communication with the display device and is configured to receive at least data representative of estimated position uncertainty (EPU) for the aircraft, and data representative of vertical estimated position uncertainty (VEPU) for the aircraft. The processor is further configured, in response to at least these data, to at least selectively render an image on the display device that includes a side view aircraft symbol representative of a side view of the aircraft, and a navigation position uncertainty graphic representative of both the EPU and the VEPU for the aircraft. The navigation position uncertainty graphic surrounds the side-view aircraft symbol and has dimensions proportional to the EPU and the VEPU for the aircraft.

In still another exemplary embodiment, a display system for an aircraft includes a display device and a processor. The processor is in operable communication with the display device and is configured to receive at least data representative of sensed aircraft altitude, and data representative of vertical estimated position uncertainty (VEPU) for the aircraft. The processor is further configured, in response to at least these data, to at least selectively render an image of an altitude tape on the display device. The rendered altitude tape includes an aircraft altitude graphic representative of the sensed aircraft altitude, and a VEPU marker. The VEPU marker comprises a first line segment disposed vertically above the aircraft altitude graphic, and a second line segment disposed vertically below the aircraft altitude graphic. The first and second line segments are separated from each other by a vertical separation distance that is proportion to the VEPU for the aircraft.

Furthermore, other desirable features and characteristics of the aircraft display system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
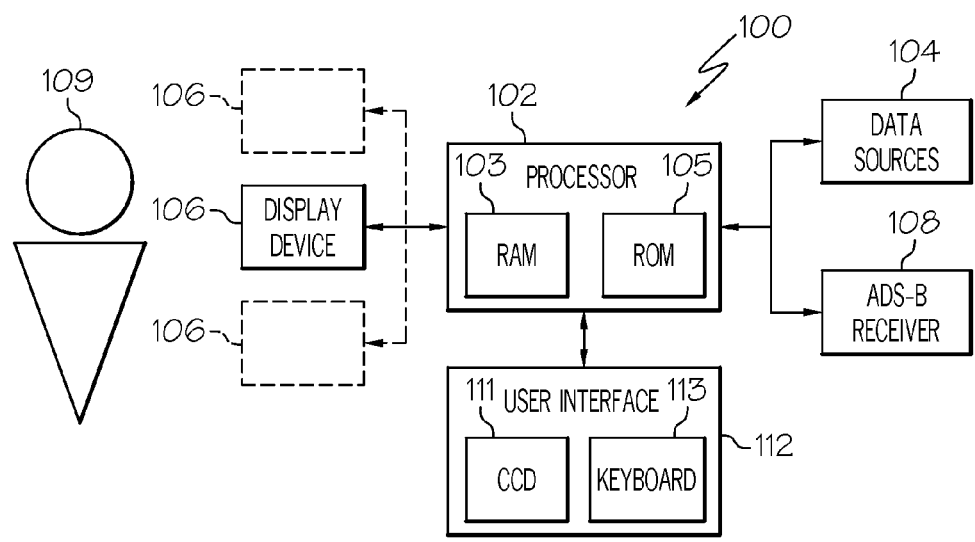
FIG. 1 is a block diagram of an exemplary embodiment of an avionics display system.

A functional block diagram of an exemplary avionics display system 100 is depicted in FIG. 1, and includes a processor 102, a plurality of data sources 104, and a display device 106. The processor 102 is in operable communication with the data sources 104 and the display device 106. The processor 102 is coupled to receive various types of aircraft data from the data sources 104. It will be appreciated that the aircraft data may vary, but in the depicted embodiment the data includes at least various aircraft navigation data, data representative of required navigation performance (RNP) for the aircraft, data representative of vertical path performance limit (VPPL) for the aircraft, data representative of estimated position uncertainty (EPU) for the aircraft, and data representative of vertical estimated position uncertainty (VEPU) for the aircraft. The processor 102 is configured, in response to at least these data, to render various images on the display device 106.

The processor 102 may be any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below.

The data sources 104 supply the above-mentioned aircraft data to the processor 102. The data sources 104 may include a wide variety of informational systems, which may reside onboard the aircraft or at a remote location. By way of example, the data sources 104 may include one or more of a runway awareness and advisory system, an instrument landing system, a flight director system, a weather data system, a terrain avoidance and warning system, a traffic and collision avoidance system, a terrain database, an inertial reference system, a navigational database, and a flight management system. The data sources 104 may also include mode, position, and/or detection elements (e.g., gyroscopes, global positioning systems, inertial reference systems, avionics sensors, etc.) capable of determining the mode and/or position of the aircraft relative to one or more reference locations, points, planes, or navigation aids, as well as the present position and altitude of the aircraft.

As FIG. 1 further depicts, in some embodiments the system 100 may also include an automatic dependent surveillance-broadcast (ADS-B) receiver 108. The ADS-B receiver 108 is configured to receive ADS-B transmissions from one or more external traffic entities (e.g., other aircraft) and supplies ADS-B traffic data to the processor 102. As is generally known, ADS-B is a cooperative surveillance technique for air traffic control and related applications. More specifically, each ADS-B equipped aircraft automatically and periodically transmits its state vector, preferably via a digital datalink. An aircraft state vector typically includes its position, airspeed, altitude, intent (e.g., whether the aircraft is turning, climbing, or descending), aircraft type, flight number and, at least in some instances, its present EPU and VEPU. Each ADS-B receiver, such as the ADS-B receiver 108 in the depicted system 100, that is within the broadcast range of an ADS-B transmission, processes the ADS-B transmission and supplies ADS-B traffic data to one or more other devices. In the depicted embodiment, and as was just mentioned, these traffic data are supplied to the processor 102 for additional processing. This additional processing will be described in more detail further below.

Before proceeding further it is noted that one or more of the position, airspeed, altitude, intent, aircraft type, flight number, present EPU, and present VEPU for the one or more traffic entities may be supplied to the processor 102 from one or more data sources 104 other than the ADS-B receiver 108. For example, the data sources 104 may additionally include one or more external radar, radio, or data uplink devices that may supply, preferably in real-time, these data.

The depicted system 100 may also include a user interface 112. The user interface 112, if included, is in operable communication with the processor 102 and is configured to receive input from a user 109 (e.g., a pilot) and, in response to the user input, supply command signals to the processor 102. The user interface 112 may be any one, or combination, of various known user interface devices including, but not limited to, a cursor control device (CCD) 111, such as a mouse, a trackball, or joystick, and/or a keyboard, one or more buttons, switches, or knobs. In the depicted embodiment, the user interface 112 includes a CCD 111 and a keyboard 113. The user 109 uses the CCD 111 to, among other things, move a cursor symbol on the display device, and may use the keyboard 113 to, among other things, input textual data.

The display device 106 is used to display various images and data, in a graphic, iconic, and a textual format, and to supply visual feedback to the user 109. It will be appreciated that the display device 106 may be implemented using any one of numerous known displays suitable for rendering graphic, iconic, and/or text data in a format viewable by the user 109. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, display device 106 includes a panel display. It is further noted that the system 100 could be implemented with more than one display device 106. For example, the system 100 could be implemented with two or more display devices 106.

No matter the number or particular type of display that is used to implement the display device 106, it was noted above that the processor 102 is responsive to the various data it receives to render various images on the display device 106. The images that the processor 102 renders on the display device 106 will depend, for example, on the type of display being implemented. For example, the display device 106 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, and as FIG. 1 depicts in phantom, the system 100 may be implemented with multiple display devices 106, each of which may implement one or more these different, non-limiting displays. The display device 106 may also be implemented in an electronic flight bag (EFB) and, in some instance, some or all of the system 100 may be implemented in an EFB.

Figure 2:
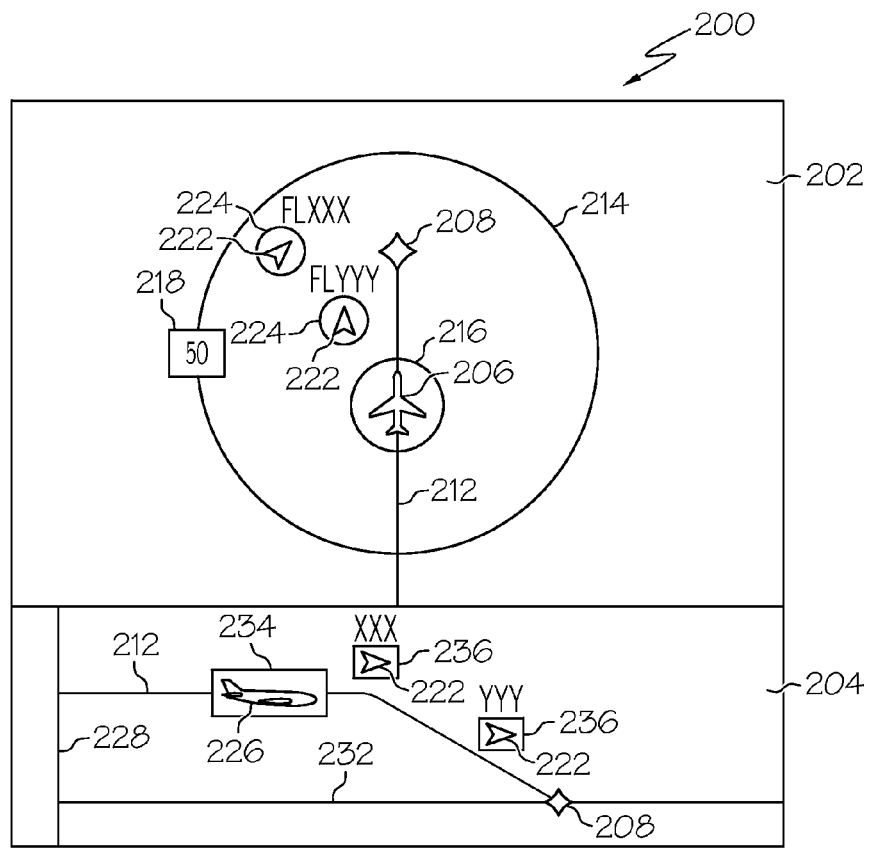
FIG. 2 depicts an exemplary image that may be rendered on the display device of the system of FIG. 1 when the display device is implementing a multi-function display.

Referring now to FIG. 2, an exemplary image that may be rendered on the display device 106 when it is implementing a MFD is depicted and will now be described. Before doing so, it is noted that the depicted MFD image 200 is merely exemplary of one embodiment, and that it could be variously implemented. It is additionally noted that not all of the rendered images that are depicted in FIG. 2 will be described, and that various other images that are not depicted in FIG. 2 (or further described) could be rendered on the on display device 106, if needed or desired.

The depicted MFD image 200 is rendered to simultaneously display a lateral map 202 and a vertical profile 204. The lateral map 202 includes a top-down aircraft symbol 206, one or more waypoint symbols 208, line segments 212 that interconnect the waypoint symbols 208, one or more range rings 214, and an EPU graphic 216. The lateral map 202 also preferably includes various map features including, but not limited to, terrain, political boundaries, and navigation aids, which, for clarity, are not shown in FIG. 2. The top-down aircraft symbol 206 is rendered at a position that is representative of aircraft position relative to the desired course. In the depicted embodiment, the aircraft is on course, and is thus rendered over the top of the rendered line segment 212. The range rings 214, only one of which is shown in FIG. 2, indicate nautical distance from the top-down aircraft symbol 206. In the illustrated embodiment, the range ring 214 includes a range indicator 218, which displays the lateral distance from the aircraft's present position to the position on the lateral map 202 that corresponds to the range ring 214 (e.g., 50 nautical miles).

Figure 3:
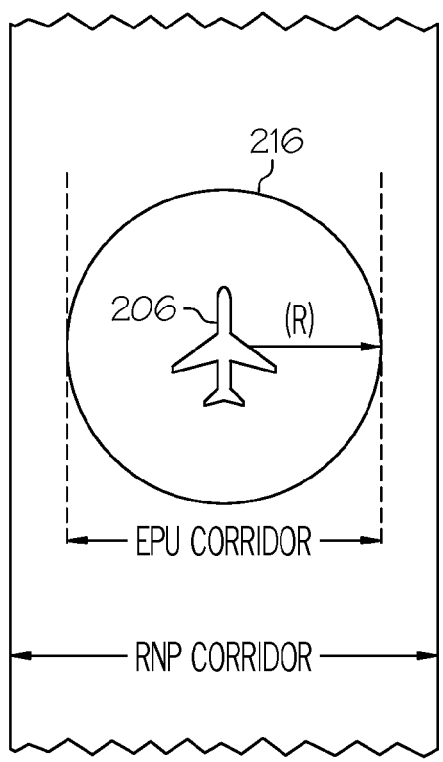
FIG. 3 is a close-up view of an estimated position uncertainty (EPU) graphic that may be rendered on the display device.

The EPU graphic 216 encircles the top-down aircraft symbol 206, and is representative of the EPU for the aircraft. As such, and with quick reference to FIG. 3, it may be seen that the EPU graphic 216 is rendered as a circle having a radius (R) that is proportional to the EPU for the aircraft, and with the top-down view aircraft symbol 206 disposed at its center. The EPU graphic 216 will thus provide improved situational awareness of what the actual horizontal position of the aircraft may be relative to its sensed horizontal position.

In addition to rendering the EPU graphic 216, the system 100 may, in at least some embodiments, be configured to provide some type of visual, audible, and/or tactile alert if the aircraft EPU exceeds a predetermined limit, the current RNP for the aircraft, or both. For example, the system 100 could be configured such that if the EPU for the aircraft exceeds a predetermined percentage of the current RNP, then the processor 102 will cause the EPU graphic 216 to be rendered in a different color. The processor 102 could instead or additionally be configured to cause an audible alert to be generated. Alternatively, the system 100 could be configured such that the processor 102 will cause the EPU graphic 216 to be rendered in a different color (and/or to generate an audible alert) only if the EPU for the aircraft meets or exceeds the current RNP. In other embodiments, the system 100 could be configured such that if the EPU for the aircraft exceeds a predetermined percentage of the current RNP, then the processor 102 will cause the EPU graphic 216 to be rendered in a first color (and/or to generate a first audible alert) and, if the EPU for the aircraft meets or exceeds the current RNP to cause the EPU graphic 216 to be rendered in a second color (and/or to generate a second audible alert). In still other embodiments, the processor 102 could be configured to supply a suitable signal to a non-illustrated glove and/or headgear that causes a tactile alert, such as vibration, in the glove and/or headgear.

Returning once again to FIG. 2, it is seen that the rendered lateral map 202 further includes one or more traffic entity symbols 222. The traffic entity symbols 222 are each representative of a different traffic entity, and are each rendered at a position that is representative of its position relative to the current position of the aircraft. In the depicted embodiment the traffic entity symbols 222 are rendered as triangular shaped objects with associated identifying indicia (e.g., a flight number). It will be appreciated, however, that this is merely exemplary. Preferably, an EPU graphic 224 encircles each of the traffic entity symbols 222 and is representative of the EPU for the associated traffic entity. Each traffic entity EPU graphic 224 is also rendered as a circle having a radius that is proportional to the EPU for the associated traffic entity, and with the traffic entity symbol 222 disposed at its center. The system 100 has the capability to render the traffic entity symbols 222 and the associated traffic entity EPU graphics 224 because, as noted above, it receives and processes data regarding other traffic entities. As was also noted above, these data may be supplied via ADS-B transmissions or one or more other data sources 104.

Turning now to the vertical profile 204, this portion of the rendered image 200 includes a side-view aircraft symbol 226, one or more waypoint symbols 208, line segments 212 that interconnect the waypoint symbols 208, a vertical axis 228, a horizontal axis 232, and a navigation position uncertainty graphic 234. The side-view aircraft symbol 226 is preferably displayed with an orientation substantially equivalent to the actual orientation of the aircraft. As with the lateral map 202, the waypoint symbols 208 and interconnecting line segments 212 correspond to the current flight path and flight plan of the aircraft. The vertical axis 228 represents aircraft altitude and is suitably graduated with altitude values (not shown), and the horizontal axis 232 represents aircraft lateral position and is suitably graduated with lateral distance values (not shown). It will be appreciated that the horizontal axis 232 could alternatively be graduated with time values in addition to, or instead of, lateral distance values.

Figure 4:
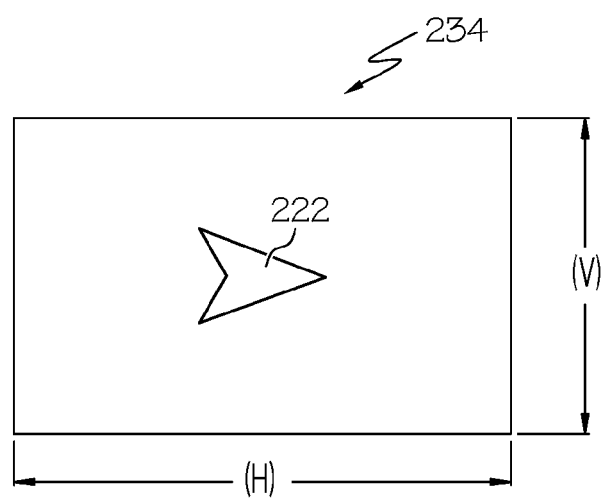
FIG. 4 is a close-up view of navigation position uncertainty graphic that may be rendered on the display device.

The navigation position uncertainty graphic 234 surrounds the side-view aircraft symbol 226, and is representative of both the EPU and the VEPU for the aircraft. The navigation position uncertainty graphic 234 has dimensions that are proportional to both the EPU and the VEPU for the aircraft. In the depicted embodiment, as is shown most clearly in FIG. 4, the navigation position uncertainty graphic 234 is preferably rendered as a box having a horizontal dimension (H) and a vertical dimension (V). The horizontal dimension of the navigation position uncertainty graphic 234 is proportional to the EPU for the aircraft, and more specifically the EPU corridor for the aircraft. The vertical dimension of the navigation position uncertainty graphic 234 is proportional to the VEPU for the aircraft, and more specifically the VEPU corridor for the aircraft. The navigation position uncertainty graphic 234, similar to the EPU graphic 216, will thus provide improved situational awareness of what the actual horizontal and vertical position of the aircraft may be relative to its sensed horizontal and vertical position.

In addition to the above, it will be appreciated that in some embodiments the system 100 may be configured to provide some type of visual, audible, and/or tactile alert if the aircraft VEPU exceeds a predetermined limit, the current VPPL for the aircraft, or both. For example, the system 100 could be configured such that if the VEPU for the aircraft exceeds a predetermined percentage of the current VPPL, then the processor 102 will cause the navigation position uncertainty graphic 234 (or a portion thereof) to be rendered in a different color. The processor 102 could instead or additionally be configured to cause an audible and/or tactile alert to be generated. Alternatively, the system 100 could be configured such that the processor 102 will cause the navigation position uncertainty graphic 234 (or portion thereof) to be rendered in a different color (and/or to generate an audible and/or tactile alert) only if the VEPU for the aircraft meets or exceeds the current VPPL. In other embodiments, the system 100 could be configured such that if the VEPU for the aircraft exceeds a predetermined percentage of the current VPPL, then the processor 102 will cause the navigation position uncertainty graphic 234 (or portion thereof) to be rendered in a first color (and/or to generate a first audible and/or tactile alert) and, if the VEPU for the aircraft meets or exceeds the current VPPL to cause the navigation position uncertainty graphic 234 to be rendered in a second color (and/or to generate a second audible and/or tactile alert). For those embodiments in which a tactile alert is generated, the processor 102 may be configured to supply a suitable signal to a non-illustrated glove and/or headgear that causes the tactile alert, such as vibration, in the glove and/or headgear.

Returning once again to FIG. 2, it is seen that the rendered vertical profile 204 further includes one or more traffic entity symbols 222. Depending upon the scales of the vertical and horizontal axes 228, 232, the traffic entity symbols 222 rendered in the vertical profile 204 may be the same as those rendered in the horizontal map 202, or there may be more or less. In any case, a traffic entity navigation position uncertainty graphic 236 preferably surrounds each of the traffic entity symbols 222 rendered in the vertical profile 204. Each traffic entity navigation position uncertainty graphic 236 is representative of the EPU and VEPU for the associated traffic entity, and is rendered as a box having a horizontal dimension that is proportional to the EPU for the associated traffic entity and a vertical dimension that is proportional to the VEPU for the associated traffic entity. The system 100 has the capability to render the traffic entity symbols 222 and the associated traffic entity navigation position uncertainty graphics 236 because, as noted above, it receives and processes ADS-B transmissions received from other traffic entities.

Figure 5:
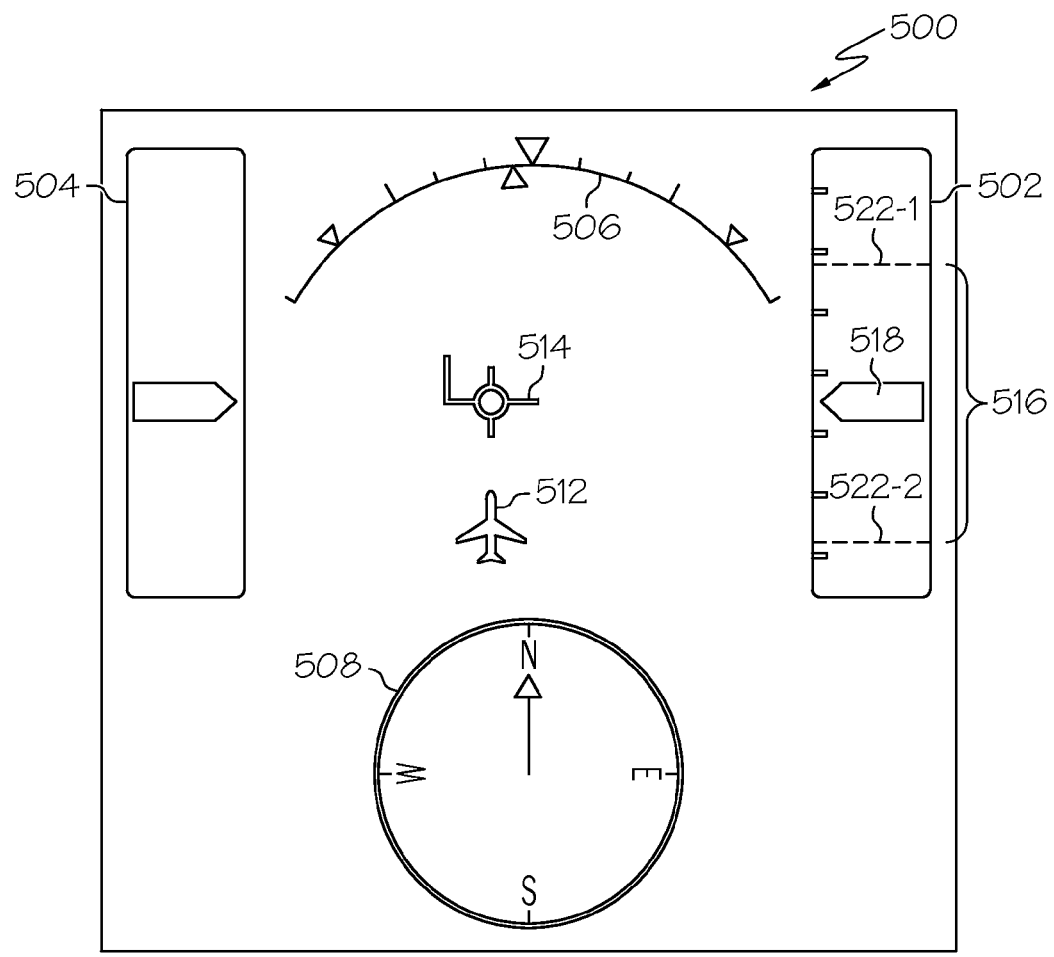
FIG. 5 depicts an exemplary image that may be rendered on the display device of the system of FIG. 1 when the display device is implementing a primary flight display.

Referring now to FIG. 5, an exemplary image that may be rendered on the display device 106 when it is implementing a PFD is depicted and will now be described. Before doing so, it is noted that the PFD image 500 that is depicted in FIG. 5 is merely exemplary of just some of the data and images that may be rendered on the display device 106 when it is implementing a PFD, and that more or less images and/or data could be rendered.

It is seen that the display device 106 renders a least an altitude indicator 502, an airspeed indicator 504, an attitude indicator 506, a heading indicator 508, an aircraft symbol 512, a flight path vector indicator 514. The display device 106 additionally renders information representative of the VEPU for the aircraft. More specifically, and as will now be described in more detail, the display device 106, in response to commands received from the processor 102, renders a VEPU marker 516 on the altitude indicator 502 (or "altitude tape").

The processor 102, as noted above, receives various data from the data sources 104. As was also noted above, these data include data representative of sensed aircraft altitude. The processor 102, in response to the data representative of sensed aircraft altitude, at least selectively renders the PFD image 500 on the display device 106 to include the altitude indicator 502. The altitude indicator 502 includes, among other things, an aircraft altitude graphic 518 that is representative of the sensed aircraft altitude. The altitude indicator 502 also preferably includes the VEPU marker 516. The VEPU marker 516, at least in the depicted embodiment, includes a first line segment 522-1 and a second lines segment 522-2. The first line segment 522-1 is disposed vertically above the aircraft altitude graphic 518, and the second line segment 522-2 is disposed below the aircraft altitude graphic 518. It may thus be understood that the first 522-1 and second 522-2 line segments are separated from each other by a separation distance that is proportion to the VEPU for the aircraft, and more specifically the VEPU corridor for the aircraft.

The system 100 may also be configured to assist in collision avoidance. For example, the system 100 may, in some embodiments, be configured to determine a probability of incursion with one or more traffic entities based on the EPU and VEPU values of the traffic entities. Based on the determined probability, a likely incursion could be graphically displayed and/or one or more alerts could be generated. Many current aircraft include systems that are configured to determine the probability of incursion with one or more traffic entities based on sensor supplied positions. However, with the system configurations disclosed herein, the EPU and VEPU corridors, rather that sensor supplied positions, are used in determining the probability of incursion. Hence, any uncertainty involved in the sensor-based positions, speeds, or intents, are accounted for in the determination.

The system 100 described herein provides one or more displays for rendering at least aircraft EPU and VEPU values non-numerically and in a fairly intuitive manner and/or the EPU and VEPU values for other traffic entities within range of the aircraft. Additionally, a probability of incursion with one or more traffic entities may be determined based on the EPU and VEPU values of the traffic entities, and selectively displayed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
a display device; and
a processor in operable communication with the display device and configured to receive at least data representative of estimated position uncertainty (EPU) for the aircraft, and traffic data associated with a traffic entity, the traffic data including at least data representative of EPU for the traffic entity, the processor further configured, in response to at least these data, to at least selectively render an image on the display device that includes:
   (i) an aircraft symbol representative of the aircraft,
   (ii) an EPU graphic representative of the EPU for the aircraft, the EPU graphic encircling the aircraft symbol and having a radius proportional to the EPU for the aircraft,
   (iii) a traffic entity symbol representative of the traffic entity, the traffic entity symbol rendered at a position that is representative of traffic entity position relative to the aircraft, and
   (ii) a traffic entity EPU graphic representative of the EPU for the traffic entity, the traffic entity EPU graphic encircling the traffic entity symbol and having a radius proportional to the EPU for the traffic entity.

2. The display system of claim 1, wherein the processor is further configured:
to receive data representative of vertical estimated position uncertainty (VEPU) for the aircraft,
the traffic data further includes at least data representative of VEPU for the traffic entity, and
in response to the traffic data and the data representative of VEPU, to at least selectively render the image on the display device to further include:
   (i) a side-view aircraft symbol representative of a side view of the aircraft, and
   (ii) a navigation position uncertainty graphic representative of the EPU and the VEPU for the aircraft, the navigation position uncertainty graphic surrounding the side-view aircraft symbol,
   (ii) a second traffic entity symbol representative of the traffic entity, the second traffic entity symbol rendered at a position that is representative of traffic entity position relative to the side-view aircraft position, and
   (iv) a traffic entity navigation position uncertainty graphic representative of the EPU and VEPU for the traffic entity, the traffic entity navigation position uncertainty graphic surrounding the second traffic entity symbol.

3. The display system of claim 2, wherein:
the navigation position uncertainty graphic and the traffic entity navigation position uncertainty graphic each comprise a box having a horizontal dimension and a vertical dimension;
the horizontal dimension of the navigation position uncertainty graphic is proportional to the EPU for the aircraft;
the vertical dimension of the navigation position uncertainty graphic is proportional to the VEPU for the aircraft;
the horizontal dimension of the traffic entity navigation position uncertainty graphic is proportional to the EPU for the aircraft;
the vertical dimension of the traffic entity navigation position uncertainty graphic is proportional to the VEPU for the aircraft.

4. The display system of claim 2, wherein the processor is further configured:
to receive data representative of sensed aircraft altitude; and
in response to the data representative of sensed aircraft altitude, to at least selectively render the image on the display device to include an altitude tape that comprises:
   (i) an aircraft altitude graphic representative of the sensed aircraft altitude, and
   (ii) a VEPU marker, the VEPU marker comprising a first line segment disposed vertically above the aircraft altitude graphic, and a second line segment disposed below the aircraft altitude graphic, the first and second line segments separated from each other by a separation distance that is proportion to the VEPU for the aircraft.

5. The display system of claim 1, wherein the processor is further configured to determine if the EPU for the aircraft exceeds a predetermined limit and, if so, render a warning graphic on the display device.

6. The display system of claim 5, wherein:
the processor is further configured to receive data representative of required navigation performance (RNP) for the aircraft; and
the predetermined limit is an RNP boundary for the aircraft.

7. The display system of claim 1, wherein the traffic data comprises automatic dependent surveillance-broadcast (ADS-B) data transmitted from the traffic entity.

8. The display system of claim 1, wherein the display device is configured to implement one or more of a multi-function display, a primary flight display, a synthetic vision system display, a vertical situation display, and a horizontal situation indicator.

9. The display system of claim 1, wherein the processor is further configured:
to receive data representative of vertical estimated position uncertainty (VEPU) for the aircraft,
the traffic data further includes at least data representative of VEPU for the traffic entity, and
in response to the traffic data, the data representative of EPU for the aircraft, and the data representative of VEPU for the aircraft, to:
   (i) determine a probability of incursion between the aircraft and the traffice entity.

10. The display system of claim 9, wherein the processor is further configured to at least selectively render the image on the display device to further include:
   (i) a side-view aircraft symbol representative of a side view of the aircraft, and
   (ii) a navigation position uncertainty graphic representative of the EPU and the VEPU for the aircraft, the navigation position uncertainty graphic surrounding the side-view aircraft symbol,
   (ii) a second traffic entity symbol representative of the traffic entity, the second traffic entity symbol rendered at a position that is representative of traffic entity position relative to the side-view aircraft position, and
   (iv) a traffic entity navigation position uncertainty graphic representative of the EPU and VEPU for the traffic entity, the traffic entity navigation position uncertainty graphic surrounding the second traffic entity symbol.

11. The display system of claim 10, wherein:
the navigation position uncertainty graphic and the traffic entity navigation position uncertainty graphic each comprise a box having a horizontal dimension and a vertical dimension;
the horizontal dimension of the navigation position uncertainty graphic is proportional to the EPU for the aircraft;
the vertical dimension of the navigation position uncertainty graphic is proportional to the VEPU for the aircraft;
the horizontal dimension of the traffic entity navigation position uncertainty graphic is proportional to the EPU for the aircraft;
the vertical dimension of the traffic entity navigation position uncertainty graphic is proportional to the VEPU for the aircraft.

12. The display system of claim 9, wherein the processor is further configured:
to receive data representative of sensed aircraft altitude; and
in response to the data representative of sensed aircraft altitude, to at least selectively render the image on the display device to include an altitude tape that comprises:
(i) an aircraft altitude graphic representative of the sensed aircraft altitude, and
(ii) a VEPU marker, the VEPU marker comprising a first line segment disposed vertically above the aircraft altitude graphic, and a second line segment disposed below the aircraft altitude graphic, the first and second line segments separated from each other by a separation distance that is proportion to the VEPU for the aircraft.

13. The display system of claim 9, wherein the traffic data comprises automatic dependent surveillance-broadcast (ADS-B) data transmitted from the traffic entity.

14. A display system for an aircraft, comprising:
a display device; and
a processor in operable communication with the display device and configured to receive at least data representative of estimated position uncertainty (EPU) for the aircraft, and data representative of vertical estimated position uncertainty (VEPU) for the aircraft, the processor further configured, in response to at least these data, to at least selectively render an image on the display device that includes:
(i) a side view aircraft symbol representative of a side view of the aircraft, and
(ii) a navigation position uncertainty graphic representative of both the EPU and the VEPU for the aircraft, the navigation position uncertainty graphic surrounding the side-view aircraft symbol and having dimensions proportional to the EPU and the VEPU for the aircraft.

15. A display system for an aircraft, comprising:
a display device; and
a processor in operable communication with the display device and configured to receive at least data representative of sensed aircraft altitude, and data representative of vertical estimated position uncertainty (VEPU) for the aircraft, the processor further configured, in response to at least these data, to at least selectively render an image of an altitude tape on the display device, the rendered altitude tape comprising:
(i) an aircraft altitude graphic representative of the sensed aircraft altitude, and
(ii) a VEPU marker, the VEPU marker comprising a first line segment disposed vertically above the aircraft altitude graphic, and a second line segment disposed vertically below the aircraft altitude graphic, the first and second line segments separated from each other by a vertical separation distance that is proportion to the VEPU for the aircraft.

* * * * *